United States Patent Office 3,696,060
Patented Oct. 3, 1972

3,696,060
PRODUCTION OF FOAMABLE RESINS
Patrick V. Burt, Newport, England, assignor to Monsanto Chemicals Limited, London, England
No Drawing. Continuation-in-part of application Ser. No. 700,361, Jan. 25, 1968, which is a continuation-in-part of application Ser. No. 418,319, Dec. 14, 1964. This application Apr. 9, 1970, Ser. No. 27,148
Claims priority, application Great Britain, Dec. 13, 1963, 49,234/63
Int. Cl. C08j 1/26
U.S. Cl. 260—2.5 B    7 Claims

ABSTRACT OF THE DISCLOSURE

A suspension polymerization process for preparing foamable beads of a thermoplastic styrene polymer by conducting the polymerization in the presence of 65–95% of the total amount of the blowing agent until the stage of 45% conversion to polymer is attained, adding the remainder of the blowing agent during the stage of 45–85% conversion, and continuing the polymerization. The late add of blowing agent is made over a period of time during which about 20–30% conversion takes place so that at least a portion of the blowing agent is added during the stage of 65–75% conversion.

CROSS-REFERENCES TO RELATED APPLICATIONS

This application is a continuation-in-part of copending application Ser. No. 700,361, filed Jan. 25, 1968, which in turn is a continuation-in-part of application Ser. No. 418,319, filed Dec. 14, 1964, both now abandoned.

BACKGROUND OF THE INVENTION

Field of the invention

This invention relates to the production of foamable resins and more particularly relates to an improved process for preparing foamable beads of a thermoplastic styrene polymer.

Description of the prior art

As is well known, foamable beads of thermoplastic styrene polymers are an important industrial commodity. However, prior art processes for preparing such foamable beads have certain disadvantages.

For example, foamable beads prepared by the most conventional polymerization processes, wherein the blowing agent is incorporated into the initial reaction mixture (as in U.S. Pat. 3,001,954), characteristically have surface "dimples" or "craters." These surface blemishes are particularly disadvantageous in the common practice of producing foamed polystyrene by:

(1) heat-expanding foamable polystyrene beads comprising polystyrene and a volatile blowing agent to produce prefoamed beads and
(2) placing the prefoamed beads in a suitable mold wherein they are heated by steam in a molding operation to effect further expansion and consolidation of the beads and thus produce an article conforming to the shape of the mold, because it has been found that the shape of the prefoamed beads has an important bearing on the properties of the final molded article and, in particular, that beads which are as nearly spherical as possible and which are free of surface craters are required for good consolidaiaon of the prefoamed beads.

In another known process for preparing foamable beads, the formation of cratered beads is avoided by conducting the initial stage of the polymerization in the absence of a blowing agent and then adding the blowing agent at a point not earlier than the "particle identity point," which is somewhere in the range of 35–75% conversion. This process, described in U.S. Pat. 3,192,169, has the unfortunate disadvantage of leading to an excessive build-up of polymer on the walls of the polymerization vessel. Particularly in commercial production, this polymer build-up is extremely detrimental since it results in lower yields and necessitates more frequent stoppages in production to enable the polymerization vessels to be cleaned.

SUMMARY OF THE INVENTION

An object of theinvention is to provide a novel process for preparing foamable beads of a thermoplastic styrene polymer.

Another object is to provide a process for preparing such foamable beads which are spherical and free of surface craters.

A further object is to provide such a process wherein the tendency toward polymer build-up on the walls of the polymerization vessel is reduced.

These and other objects are attained by utilizing a unique method of incorporating the blowing agent in an otherwise conventional process for preparing foamable beads by polymerizing a polymerizable material comprising styrene in an aqueous suspension system in the presence of 3–10% by weight of a volatile organic blowing agent. In the process of the invention, the polymerization is conducted in the presence of only 65–95% of the total amount of blowing agent until the stage of 45% conversion is attained, and the remaining 5–35% of the blowing agent is added during the stage of 45–85% conversion over a period of time during which about 20–30% conversion takes place so that at least a portion of the blowing agent is added during the stage of 65–75% conversion.

DESCRIPTION OF THE PREFERRED EMBODIMENTS

The following examples are given to illustrate the invention and are not intended as a limitation thereof. Unless otherwise specified, quantities mentioned are quantities by weight.

EXAMPLE I

Part A—Control

Charge the following components of a polymerization mixture to a suitable reaction vessel:

| Component | Parts |
|---|---|
| Styrene | 100 |
| Pentane | 8.55 |
| Benzoyl peroxide | 0.55 |
| t-Butyl perbenzoate | 0.09 |
| Water | 125 |
| Hydroxyethyl cellulose | 0.14 |

Heat the polymerization mixture at 78° C. for 22.5 hours while continuously stirring at a rate of 380 r.p.m.

The polymerization results in the formation of badly cratered, foamable beads of polystyrene having an average diameter of 1 mm. and exhibiting a large bubble or crater in each bead. An amount of polystyrene corresponding to 8.32% of the original styrene charge remains adhered to the agitator and the walls of the reaction vessel at the end of the reaction.

Part B—Control

Repeat Part A except for continuously adding the pentane at a uniform rate over a period of 3 hours after 7 hours of reaction time, i.e., at the stage of 55–75% conversion of monomer to polymer, instead of incorporating it in the initial reaction mixture.

The polymerization results in the formation of round, foamable polystyrene beads. An amount of polystyrene corresponding to 3.6% of the original styrene charge remains adhered to the agitator and the walls of the reaction vessel at the end of the reaction.

Part C

Repeat Part A except for incorporating only 5.82 parts of pentane in the initial reaction mixture and adding the remaining 2.73 parts over a period of 3 hours commencing after 7 hours of reaction time.

The polymerization results in the formation of round, foamable polystyrene beads which are free of craters. The amount of polystyrene remaining adhered to the agitator and the walls of the reaction vessel at the end of the reaction corresponds to only 1.0% of the original styrene charge.

EXAMPLE II

Part A

Charge the following components of the polymerization mixture to an autoclave fitted with a stirrer:

| Component: | Parts |
| --- | --- |
| Styrene | 100 |
| Petroleum ether | 6.35 |
| Benzoyl peroxide | 0.71 |
| Water | 259 |
| Polyvinylpyrrolidone | 0.94 |
| Sodium pyrophosphate | 0.25 |
| Sodium bicarbonate | 0.02 |

Close the autoclave after passing in nitrogen to a pressure slightly above atmospheric pressure, and heat the reaction mixture at 82° C. for 9 hours, while stirring, to convert about 60% of the styrene to polymer. Then add 1.41 parts of petroleum ether under pressure over a period of 3 hours, and continue heating the reaction mixture with stirring for an additional 21 hours. Then allow the autoclave to cool, vent to atmospheric pressure, and recover the foamable beads formed by the reaction. Only a minute amount of polystyrene remains adhered to the agitator and the walls of the autoclave.

When the foamable beads are heated in a steam atmosphere for 4 minutes, the resultant prefoamed beads are spherical and free of surface deformities and have a bulk density of 11 ounces per cubic foot. A foamed product obtained by allowing the prefoamed beads to dry on an open tray for one day and then molding them into a 1 foot cube block has excellent physical properties, the foamed cells being well bonded together.

Part B—Control

Repeat Part A except for incorporating 7.76 parts of petroleum ether in the initial reaction mixture and not adding any further amount during the reaction. The amount of polystyrene which remains adhered to the agitator and the walls of the autoclave is much larger than in Part A.

When the beads formed by the reaction are prefoamed, they are egg-shaped, and many of them have surface deformities. A block molded from the prefoamed beads is not as well consolidated as the block molded from the beads of Part A.

The polymerizable material employed in the practice of the invention is preferably styrene, but it can also be a mixture of styrene with one or more copolymerizable monomers, preferably a vinylidene monomer such as a different monovinylidene aromatic monomer, e.g., alpha-methylstyrene, vinyl toluene, p-ethylstyrene, 2,4-dimethylstyrene, o-chlorostyrene, 2,5-dichlorostyrene, vinyl naphthalene, etc.; an olefin or diolefin, e.g., ethylene, propylene, isobutylene, butadiene, isoprene, etc.; an unsaturated carboxylic acid or derivative thereof, e.g., acrylic acid, acrylamide, acrylonitrile, methyl acrylate, ethyl acrylate, other alkyl acrylates wherein the alkyl group contains 1–18 carbon atoms, the corresponding methacrylic compounds, etc. Other monomers which can be copolymerized with styrene in the practice of the invention include alpha, beta-unsaturated polycarboxylic acids and derivatives thereof, e.g., maleic anhydride, diethyl maleate, dibutyl fumarate, etc. When a comonomer is employed in the practice of the invention, its concentration should be such that the styrene constitues at least 50%, perferably at least 75%, of the weight of the polymerizable material.

The polymerizable material can also contain a rubber, e.g., natural rubber, polybutadiene, polyisoprene, copolymers of butadiene and/or isoprene with lesser amounts of comonomers such as styrene, acrylonitrile, methyl methacrylate, etc., dissolved in the styrene and any other monomers included in the polymerizable material. When employed, the rubber ordinarily constitutes about 1–25% of the weight of the polymerizable material.

The blowing agent employed in the practice of the invention is a volatile organic compound which has an atmospheric boiling point of less than about 80° C., preferably in the range of about −10° C. to about 80° C. It should be non-reactive and have, at most, a slight solvent action on thermoplastic styrene polymers. Exemplary of suitable blowing agents are aliphatic hydrocarbons such as propane, butane, isobutane, the pentanes, hexane, isohexane, cyclohexane, etc.; halogenated aliphatic hydrocarbons such as ethyl chloride, propyl chloride, butyl chloride, isopropyl bromide, and particularly the perchlorofluorocarbons such as dichlorodifluoromethane, monochlorotrifluoromethane, trichloromonofluoromethane, 1,1,2,2-tetrachloro-1,2-difluoroethane, and the corresponding perchlorofluorocarbons disclosed in U.S. Pat. 2,848,428; aliphatic amines such as ethylamine, propylamine, isopropylamine, butylamine, dimethylamine, diethylamine, etc.; aliphatic ethers such as diethyl ether, diisopropyl ether, methyl ethyl ether, ethyl isopropyl ether, etc.; acetaldehyde, etc. Other suitable blowing agents are disclosed in U.S. Pat. 2,681,321. The preferred blowing agent for use in the present invention is pentane.

When desired, the blowing agent can comprise a mixture of a major amount, e.g., 70–99% by weight, of a blowing agent of the type described above and a minor amount, e.g., 30–1% by weight, of an organic solvent having a solvent action on thermoplastic styrene polymers. Exemplary of suitable solvents are acetone, methylene chloride, styrene monomer, benzene, xylene, carbon tetrachloride, chloroform, etc. Preferably, the organic solvent should have a boiling point not higher than about 80° C.

The total amount of blowing agent employed in the process of the invention is about 3–10%, preferably about 5–8%, based on the weight of the polymerizable material. As mentioned earlier, the major portion of the blowing agent is present from the beginning of the polymerization reaction. The amount of blowing agent added during the stage of 45–85% conversion is about 5–35%, preferably about 10–20%, e.g., about 15%, of the total amount of blowing agent.

The late add of blowing agent can be incremental but is preferably continuous, and it is made over a period of time during which about 20–30% conversion takes place. At least a portion of the blowing agent is added during the stage of 65–75% conversion, and it is preferable for blowing agent to be added throughout the period of 65–75% conversion. According to a preferred embodiment of the invention, the late add of blowing agent is commenced at the stage of about 50–55% conversion and continued until the stage of about 80–85% conversion.

The polymerization is conducted in an aqueous suspension system and can employ the reaction conditions and polymerization adjuvants conventionally used in such processes. Thus, for example, the polymerization can be conducted at a temperature of 60–100° C. or higher under a pressure of 1–10 atmospheres in the presence of a conventional catalyst such as an azo compound, e.g., azobisisobutyronitrile, or a peroxy compound, e.g., cumene hydroperoxide, benzoyl peroxide, acetyl benzoyl peroxide, di-t-butyl peroxide, etc., alone or in combination with a reducing agent providing a redox system. Agitation, usually by means of a stirrer, is employed to keep the polymerizable material in suspension, and it is conventional to employ suspending agents such as water-insoluble inorganic oxides, hydroxides, and salts and water-soluble polymers such as polyvinyl alcohols, methyl cellulose, gelatine, polyvinylpyrrolidone, carboxymethylcellulose and its water-soluble salts, and polyacrylic acids and their water-soluble salts.

After the polymerization, the system is allowed to cool to room temperature, the pressure is adjusted to atmospheric pressure, and the foamable beads can then be filtered off, washed if necessary, and dried. They are then ready for use in the production of foamed thermoplastic styrene polymers by foaming and molding in the ordinary way.

The process of the invention is particularly advantageous in that it (1) reduces detrimental build-up of polymer on the walls of the polymerization vessel and (2) results in the formation of spherical, foamable beads which are free of surface craters and which, because of their good shape and surface, impart better physical properties to foamed articles which are molded from them.

It is obvious that many variations can be made in the proudcts and processes set forth above without departing from the spirit and scope of this invention.

What is claimed is:

1. In a process for preparing foamable beads by polymerizing 100 parts by weight of a polymerizable material comprising styrene in an aqueous suspension system in the presence of 3–10 parts by weight of a volatile organic blowing agent, the improvement which comprises conducting the polymerization in the presence of only 65–95% of the total amount of blowing agent until the stage of 45% conversion to polymer is attained and adding the remaining 5–35% of the blowing agent during the stage of 45–85% conversion over a period of time during which about 20–30% conversion takes place so that at least a portion of the blowing agent is added during the stage of 65–75% conversion.

2. The process of claim 1 wherein the polymerization is conducted in the presence of about 5–8 parts by weight of the blowing agent, only 80–90% of which is present until the stage of about 50–55% conversion is attained, and the remaining 10–20% of which is added from the stage of about 50–55% conversion until the stage of about 80–85% conversion.

3. The process of claim 2 wherein the amount of blowing agent added between about 50–55% conversion and about 80–85% conversion is about 15% of the total amount of blowing agent.

4. The process of claim 1 wherein the blowing agent is pentane.

5. The process of claim 1 wherein the blowing agent is petroleum ether.

6. The process of claim 1 wherein the polymerizable material is styrene.

7. The process of claim 1 wherein the polymerizable material is a mixture of at least 50% by weight of styrene and up to 50% by weight of copolymerizable monomers.

References Cited

UNITED STATES PATENTS

| | | | |
|---|---|---|---|
| 3,265,642 | 8/1966 | Hatano et al. | 260—2.5 B |
| 3,505,253 | 4/1970 | Finestone et al. | 260—2.5 B |
| 3,496,123 | 2/1970 | Wolff | 260—2.5 B |
| 3,192,169 | 6/1965 | Doak | 260—2.5 B |

MURRAY TILLMAN, Primary Examiner

M. FOELAK, Assistant Examiner

U.S. Cl. X.R.

260—93.5 W